United States Patent Office 3,356,807
Patented Dec. 5, 1967

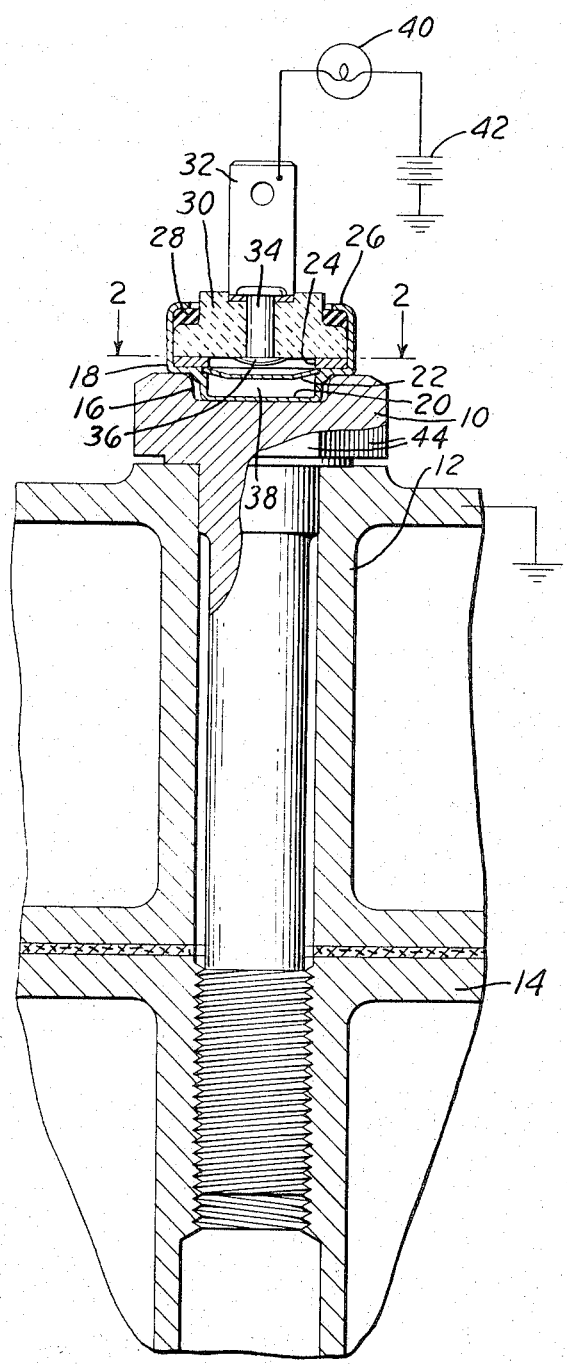
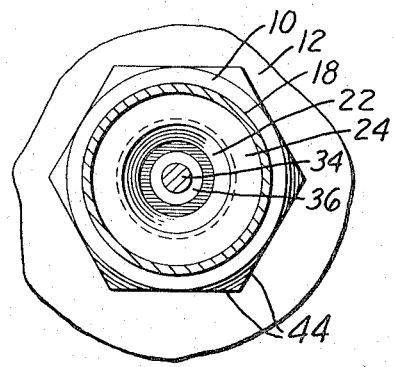
Fig.1
Fig.2
INVENTORS
WILLIAM E. BROWN
WILLARD C. SHAW
BY
Donald P. Selvecki
ATTORNEY

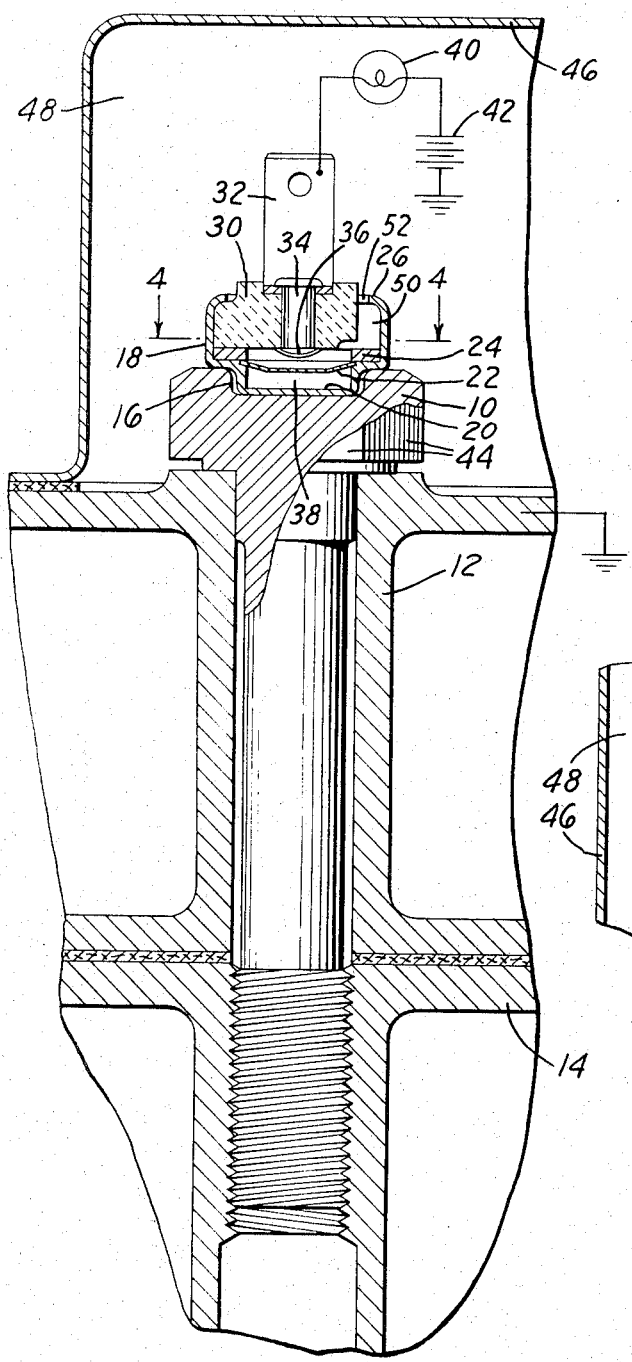
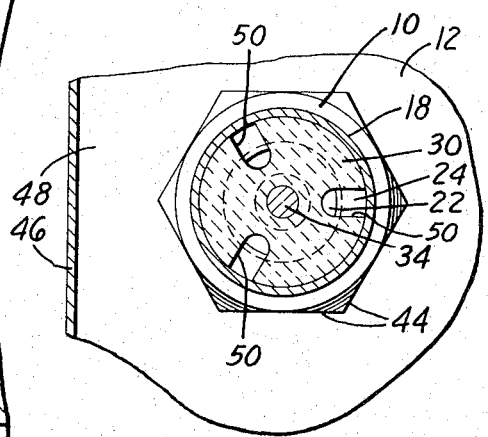
Fig. 4
Fig. 3

3,356,807
CYLINDER HEAD BOLT WITH TEMPERATURE AND CONTAMINANT INDICATOR
William E. Brown and Willard C. Shaw, Anderson, Ind., assignors to General Motors Corporation, Detroit, Mich., a corporation of Delaware
Filed Sept. 27, 1965, Ser. No. 490,481
1 Claim. (Cl. 200—138)

This invention relates to electrical switching devices and more particularly to a temperature sensitive switch adapted for use in an indicating system of a vehicle for showing an overheat condition in an internal combustion engine.

In internal combustion engines normally used on motor vehicles, a temperature indicator is provided which indicates the temperature of cooling fluid circulated therethrough. Certain inherent disadvantages are attendant to such an indicator, among which are the lack of response of such a device to actual cylinder head temperature and the lack of response to engine oil temperature. In addition, cooling system temperature indicators in common usage are generally removed a distance from the engine block itself and, in sensing the coolant temperature, only indirectly sense the temperature of the block itself.

It is an object of the present invention to provide an improved temperature sensitive switch arranged to respond to temperature fluctuations in a vehicle engine beyond certain predetermined limits.

It is another object of the present invention to provide an improved temperature sensitive switch which can be mounted in direct heat transfer relation with certain selected areas in the engine block.

It is still another object of the present invention to provide an improved temperature sensitive switch which can directly sense oil temperature.

It is a further object of the present invention to provide an improved temperature sensitive switch which can sense the temperature of internal portions of the engine normally inaccessible from the exterior thereof.

It is yet a further object of the present invention to provide an improved temperature sensitive switch which is simple in nature and economical to manufacture.

Further objects and advantages of the present invention will be apparent from the following description, reference being had to the accompanying drawings wherein preferred embodiments of the present invention are clearly shown.

In the drawings:

FIGURE 1 is a sectional view of the subject invention shown in its operative environment;

FIGURE 2 is a sectional view taken along line 2—2 of FIGURE 1;

FIGURE 3 is a sectional view of another embodiment of the subject invention shown in its operative environment; and FIGURE 4 is a sectional view taken along line 4—4 of FIGURE 3.

Referring to FIGURE 1, a cylinder head bolt 10 is illustrated as maintaining cylinder head 12 in engagement with block 14. Bolt 10 is a typically constructed cylinder head bolt except for a depressed portion 16 formed in the head thereof. A body 18 has a cup-shaped portion 20 shaped in complementary fashion with respect to depression 16. Body 18 is fastened to bolt 10 in any well-known fashion, such as by welding. Bimetallic element 22 is carried in thermal conductive relationship with cup-shaped portion 20 and is maintained operatively positioned against washer 24 by peened-over portion 26 of body 18 acting through resilient member 28 and insulating member 30.

Terminal 32 is operatively positioned in insulating member 30 by rivet 34 which presents a fixed contact head to bimetallic element 22 in chamber 38. Terminal 32 electrically engages lamp 40 which in turn is grounded through battery 42. It should be noted that cylinder head 12 is also grounded with an interruption in the circuit to lamp 40 provided by a normal separation between bimetallic element 22 and fixed contact 36.

Referring to FIGURE 2, hexagonal surface 44 of bolt 10 is shown which adapts the bolt to be tightened in the conventional manner.

In operation, heat is developed in the internal combustion engine and freely transmitted to block 14 and cylinder head 12. Bolt 10 is operatively positioned in thermal conductive relationship to both head 12 and block 14 and, being of any well-known conductive material, freely receives heat therefrom. This heat is transmitted into contiguously positioned cup-shaped portion 20 and into bimetallic element 22 in conductive relationship therewith. Bimetallic element 22 is designed so that it deflects into contact with fixed contact 36 when a certain predetermined temperature is exceeded. When bimetallic element 22 engages fixed contact 36, a ground is provided for lamp 40 from fixed contact 36 through bimetallic element 22 to cup-shaped portion 20 to bolt 10 into head 12 or block 14, both of which are grounded. When this occurs, lamp 40 becomes incandescent, alerting a vehicle operator to the fact that certain predetermined temperatures in head 12 or block 14 have been exceeded. Lamp 40 is normally positioned in the driving compartment of a vehicle. The vehicle operator is therefore immediately apprised of the fact that an overheat condition exists in the engine.

Referring to FIGURE 3, another embodiment of the subject invention is illustrated in which the subject temperature sensitive switch is utilized as a cylinder head bolt on an engine equipped with overhead valves. Certain portions of the overhead valves are operatively positioned within valve cover 46 substantially enclosing the temperature responsive switch. In the normal course of engine operation, engine oil is circulated into area 48 within the valve cover 46 thereby providing another source of heat for the temperature responsive switch. It should be noted that the numerals applied to the structure in the embodiment of FIGURE 1 are applied also to the embodiment of FIGURE 3 with new numerals only used to designate structure not found in FIGURE 1.

Insulating member 30 has peripheral grooves 50 cooperating with apertures 52 formed in peened-over portion 26 of cup-shaped portion 20. In this manner, a passage for fluid communication is provided between area 48 and chamber 38. Therefore, engine oil normally circulated in area 48 is freely communicated to bimetallic element 22 causing the bimetallic element to be responsive to the temperature thereof.

The embodiment of FIGURE 3 functions in exactly the same manner as the embodiment of FIGURE 1 except for the direct communication of lubricating oil to the bimetallic element 22. The subject temperature sensitive switch therefore responds to the temperature of oil circulated into area 48 as well as to the temperature of head 12 and block 14. The utility of the subject device is thereby extended in that oil deriving heat from an area of an engine not readily in thermal conductive relationship with bolt 20 communicates its temperature through the oil to the bimetallic element 22. The non-conductivity of the oil makes the operation of the subject switch the same as in the embodiment of FIGURE 1. An added advantage of this embodiment is that, if the non-conductivity of the oil is changed by the addition of certain impurities, such as metal particles, the subject temperature sensitive switch responds by grounding lamp 49 to apprise the vehicle operator of a problem in the engine. The specific nature of the problem can be investigated and be resolved as a cooling problem or a problem relating to contaminated oil. It is obvious that contaminants in an oil will generally not be constant throughout an oil flow so that intermittent grounding of the lamp would result, thereby providing an indication to the vehicle operator that the problem is in the oil and not necessarily in an overheated engine.

The utility of the subject invention is particularly clear in that the subject temperature sensitive switch is carried by a necessary portion of an engine and does not require a separate mounting means. In addition, the light of the normal cylinder head bolt allows a conductive relationship to be set up between the subject switch and portions within the engine normally inaccessible to temperature sensitive devices. The cup-shaped portion of body 18 provides a maximum conductive surface exposed to bolt 10, thereby insuring quick response of bimetal 22 to temperatures beyond the acceptable operating range. Incorporation of the embodiment shown in FIGURE 3 enables the switch to be mounted on a conventional cylinder head bolt and extends the utility to the sensing of oil temperature. Excessive contaminants in the oil providing an unscheduled shorting of the subject switch enables the vehicle operator to have an indication of a condition not found in the prior art. The subject invention in its present form could also be mounted in any selective portion of the engine where an overheat condition is likely to occur thereby providing the same indication possible with a much more expensive thermocouple and associated indicating devices. The simplicity of the subject invention along with its combination with a necessary part of an engine makes the subject temperature sensitive switch far superior to the normal coolant temperature switches found on internal combustion engines.

While the embodiments of the present invention, as herein disclosed, constitute preferred forms, it is to be understood that other forms might be adopted.

What is claimed is as follows:

The combustion of a temperature sensitive switch and a cylinder head bolt for an internal combustion engine, said cylinder head bolt having a depression in the head thereof, said temperature sensitive switch comprising: a body of thermal conductive material including a cup-shaped portion carried in the depression of the bolt head, said body having a fixed contact passing through a portion thereof to an external terminal electrically connected to an indicating device; bimetallic element carried in direct thermal conductive relationship with said body portion, said bimetallic element having a portion situated apart from but in cross relationship to said fixed contact; insulating means including resilient mounting means disposed on either side thereof to operatively position said bimetallic element and said insulating means between a relatively fixed wall of said body and an inturned portion thereof, said insulating means and said body having aligned apertures adapted to permit the flow of fluids from the internal combustion engine into contact with said bimetallic element, said bimetallic element and a conductive fixed contact being closely separated so that electrically conductive contaminants carried in said fluids when situated between the fixed contact and the bimetallic element cause shorting thereacross to an indicating means; terminal means carried by said insulating member including a fixed contact in juxtaposition to said bimetallic element adapted to be electrically conductively engaged thereby upon deflection thereof in response to a temperature increase above predetermined limits in the internal combustion engine; and an electrical indicating means electrically engaging said terminal and being selectively grounded to said fixed contact and said bimetallic element when said bimetallic element assumes a deflected condition, said electrical indicating means thereby being energized in response to a fully deflected bimetallic element and a partially deflected bimetallic element and contaminants in the fluid passing between the bimetallic element and the fixed contact.

References Cited

UNITED STATES PATENTS

| | | | |
|---|---|---|---|
| 2,442,945 | 6/1948 | Andersen | 200—138 |
| 2,863,024 | 12/1958 | Romine | 200—138 |
| 3,206,657 | 9/1965 | Moriya | 317—201 |

BERNARD A. GILHEANY, *Primary Examiner.*

H. A. LEWITTER, *Assistant Examiner.*

UNITED STATES PATENT OFFICE
CERTIFICATE OF CORRECTION

Patent No. 3,356,807 December 5, 1967

William E. Brown et al.

It is hereby certified that error appears in the above numbered patent requiring correction and that the said Letters Patent should read as corrected below.

Column 3, line 39, for "combustion" read -- combination --.

Signed and sealed this 18th day of February 1969.

(SEAL)
Attest:

Edward M. Fletcher, Jr.
Attesting Officer

EDWARD J. BRENNER
Commissioner of Patents